United States Patent [19]

Netzhammer

[11] 4,455,808

[45] Jun. 26, 1984

[54] SEALING SHOE ASSEMBLY

[75] Inventor: Peter Netzhammer, Klettgau, Fed. Rep. of Germany

[73] Assignee: SIG - Schweizerische Industrie-Gesellschaft, Neuhausen am Rheinfall, Switzerland

[21] Appl. No.: 333,690

[22] Filed: Dec. 23, 1981

[30] Foreign Application Priority Data

Dec. 24, 1980 [CH] Switzerland .......................... 9597/80

[51] Int. Cl.³ ...................... B65B 51/16; B65B 51/30
[52] U.S. Cl. ........................................ 53/373; 53/379
[58] Field of Search ................. 53/373, 329, 379, 450, 53/548, 551, 552, 550; 156/515, 553, 555, 581

[56] References Cited

U.S. PATENT DOCUMENTS

| | | | | |
|---|---|---|---|---|
| 2,276,083 | 3/1942 | Moeller | ........................... | 156/181 X |
| 2,362,459 | 11/1944 | Barnett | ............................. | 53/450 X |
| 3,243,334 | 3/1966 | Lake | ................................. | 53/379 X |
| 4,106,265 | 8/1978 | Aterianus | ............................. | 53/550 |
| 4,254,601 | 3/1981 | Prager et al. | ..................... | 53/373 X |

Primary Examiner—Horace M. Culver
Attorney, Agent, or Firm—Spencer & Frank

[57] ABSTRACT

A sealing shoe assembly for providing superposed sheets with a sealing seam formed by a criss-cross pattern of straight lines by pressing together areas of the superposed sheets comprises a first pair of cooperating sealing shoes each having a plurality of parallel-extending stamping edges oriented in a first direction and a second pair of cooperating sealing shoes each having a plurality of parallel-extending stamping edges oriented in a second direction. The stamping edges of the cooperating sealing shoes are arranged to periodically assume a meshing relationship for pressing together predetermined areas of the superposed sheets passing between the cooperating shoes. The first and second pairs of sealing shoes are arranged for stamping the predetermined areas in sequence for providing the criss-cross pattern.

12 Claims, 6 Drawing Figures

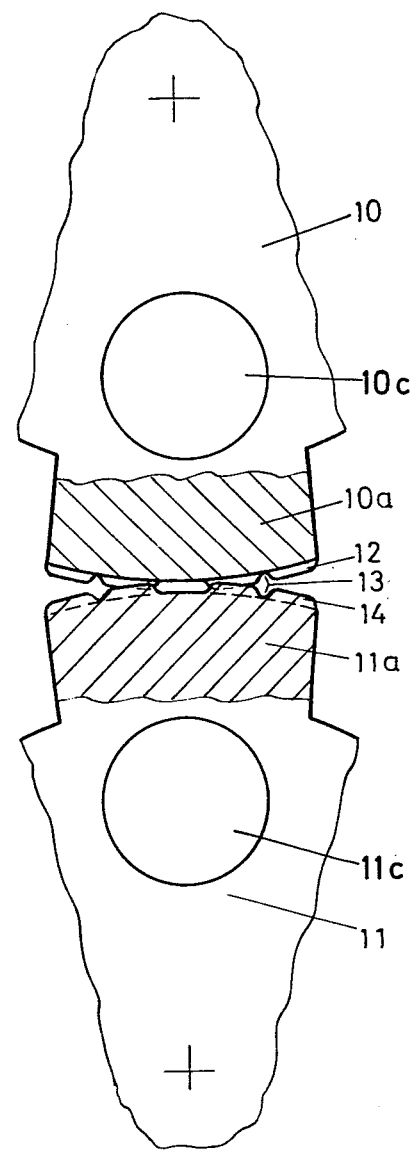
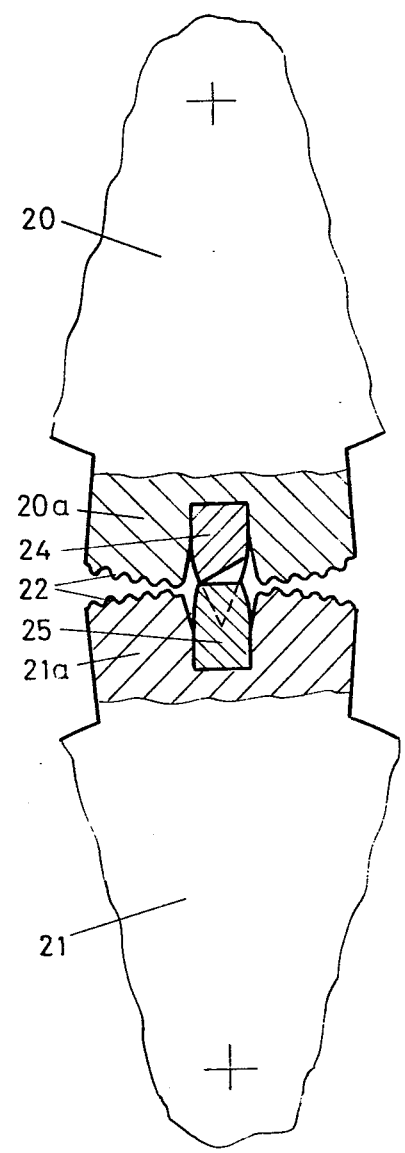

SEALING SHOE ASSEMBLY

BACKGROUND OF THE INVENTION

This invention relates to a sealing shoe assembly for packaging machines which utilize wrapper sleeves (hose-like wrappers). The sealing shoe assembly has at least one pair of rotary sealing shoes provided with stamping (embossing) edges for forming a straight-line pattern of pressed-together areas in the face-to-face arranged portions of the wrapper sleeve.

In package making by means of wrapper sleeves, the incoming spaced articles to be packaged are introduced into the wrapper sleeves and subsequently the sleeves are closed and sealed by stamping (pressing-together) and the individual packages are separated from one another. The sealing shoe assemblies have face-to-face arranged stamping heads which are rotatably supported on the machine frame and which are well known in the packaging art.

U.S. Pat. No. 2,546,721 discloses a sealing shoe assembly which has two stamping heads mounted on cooperating rotary rolls. Each stamping head has elevations and depressions so designed that a waffle pattern is formed wherein the boundary lines form the elevations. It has been found that in case heavy wrapper material is used for the wrapper sleeve having longitudinal seams or pinch folds, the above-outlined stamped seal will be gas-tight only if the packing machine operates with a substantially reduced speed since, in particular, the sequence of the operational steps has to be coordinated with the required heat supply to the sealing shoes.

SUMMARY OF THE INVENTION

It is an object of the invention to provide an improved sealing shoe assembly with which gas-tight seams can be obtained independently from the number of layers of the packaging material or independently from its thickness and wherein the throughout velocity remains the same or can even be increased.

This object and others to become apparent as the specification progresses, are accomplished by the invention, according to which, briefly stated, the sealing shoe assembly has a first pair of sealing shoes on which the stamping edges are arranged in a first direction parallel to one another and a second pair of sealing shoes in which the stamping edges are arranged in another, second direction parallel to one another.

BRIEF DESCRIPTION OF THE DRAWING

FIG. 2 is a sectional view in a plane indicated at II—II of FIG. 1.

FIG. 3 is a sectional view in a plane indicated at III—III of FIG. 1.

DESCRIPTION OF THE PREFERRED EMBODIMENT

A packaging machine which may incorporate the invention may be of the type disclosed in U.S. Pat. No. 2,546,721. The invention resides in the particular stamping heads sealing shoes which will be described below in detail.

Figure 1:
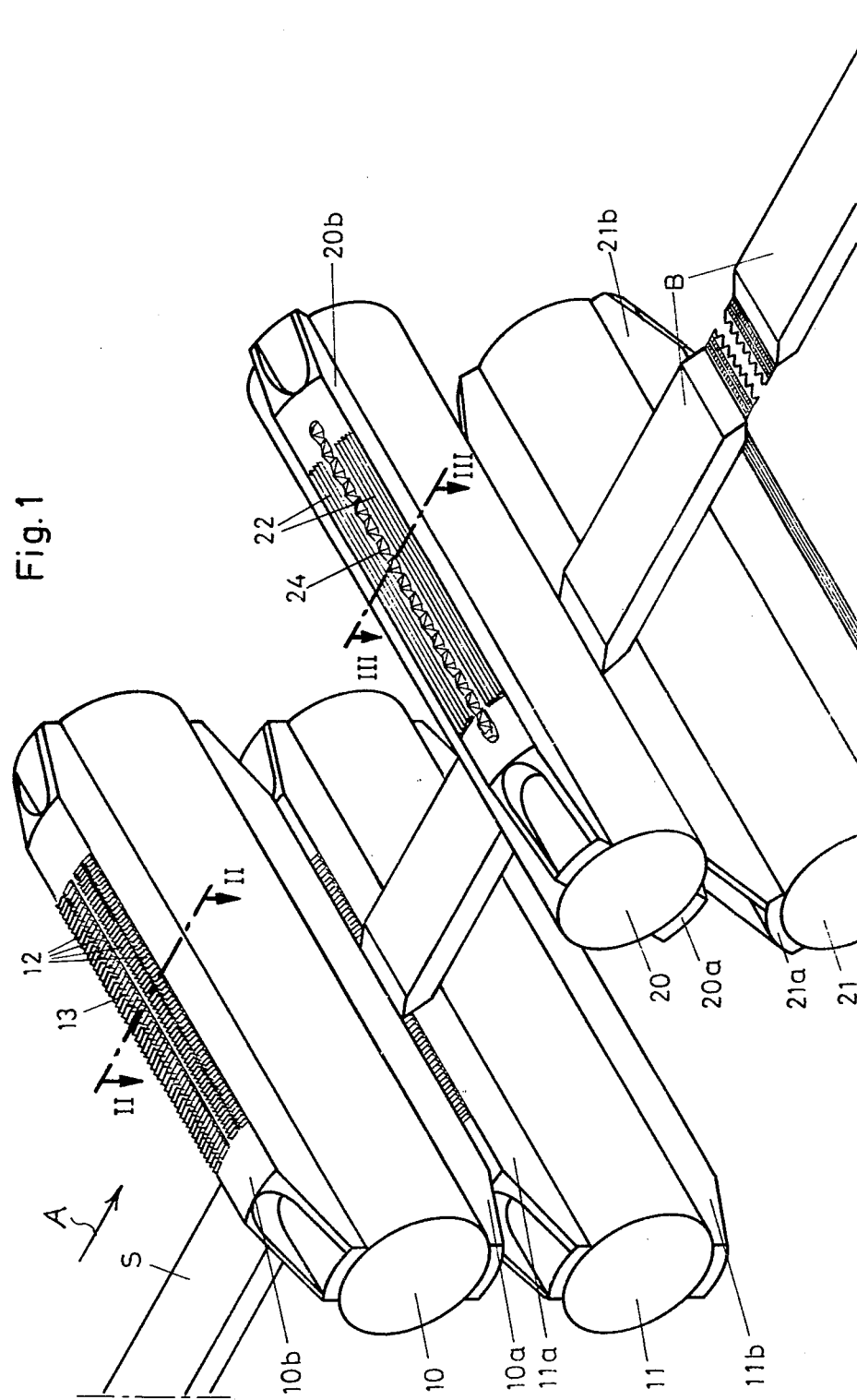
FIG. 1 is a perspective view of a preferred embodiment of the invention.

Turning now to FIG. 1, a continuous packaging sleeve S advances in the direction of the arrow A. First stamping head sealing shoe pairs 10a, 11a and 10b, 11b are mounted conventionally on respective rolls 10 and 11 which rotate with identical speeds. The stamping edges 12 extend perpendicularly to the axis of the rolls 10 and 11 and on each head the stamping edges 12 are divided into groups by grooves 13 extending parallel to the roll axis.

Downstream of the first stamping head sealing shoe pairs 10a, 11a and 10b, 11b there is arranged a further roll pair 20, 21 each carrying a pair of cooperating stamping heads sealing shoes 20a, 21a and 20b, 21b, each having a work face that includes stamping edges 22 which are arranged parallel to the axis of the rolls. Approximately in the mid-zone of the stamping edges 22 there extend knife elements 24, 25 in a direction parallel to the roll axes for severing the sealed wrapper sleeves into individual bags B.

Turning now to FIG. 2, it is seen that as the stamping heads carried on roll 10 cooperate with the respective stamping heads carried on roll 11, the stamping edges 12 and 14 are in a meshing relationship with one another such that at all times an elevation on one stamping head is in registry with a depression (valley) on the other stamping head. The same arrangement is provided for the stamping heads carried by the rolls 20 and 21 as illustrated in FIG. 3. FIG. 3 further shows that the cutting elements 24 and 25 are also in a meshing relationship to perform their severing function.

Figure 4:
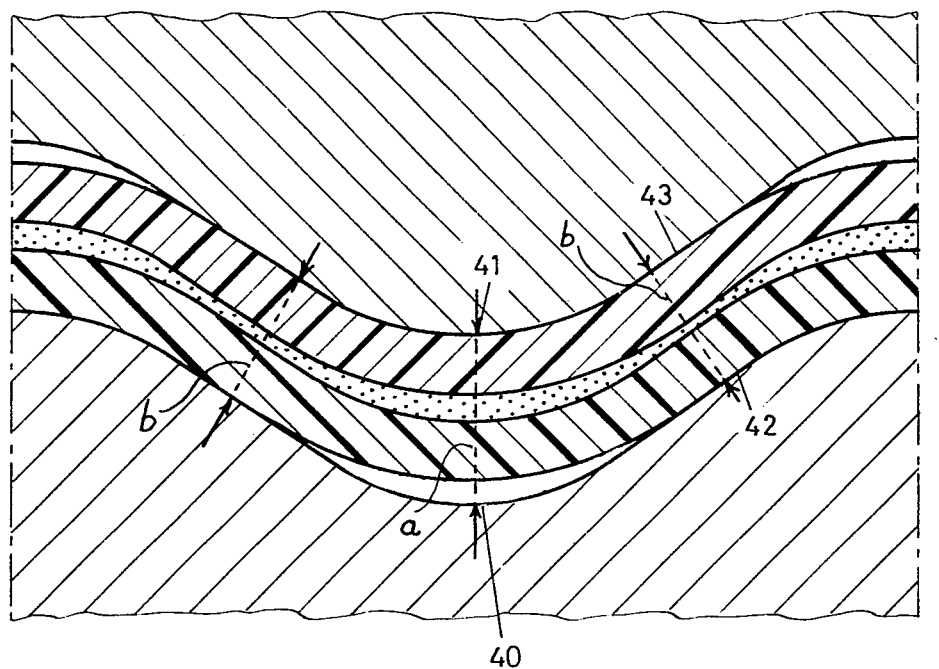
FIG. 4 is a sectional view on an enlarged scale of meshing stamping heads, taken in a plane perpendicular to the stamping edges.

Turning now to FIG. 4, there are shown in cross section and on a greatly enlarged scale fully meshing stamping edges of cooperating stamping heads, with the wrapper therebetween. Between the two thicknesses of the wrapper a sealing material is provided. It is seen that the distance a between the highest point 41 of a stamping edge on one head and the lowest point 40 of a valley between two stamping edges on the other head is greater than the distance b between the flanks 42 and 43 on either side of the distance a. As a result, the sealing material, such as an adhesive or a thermoplastic resin, is pressed from the portions between the flanks into the portions between the elevations and valleys. The same purpose is served by the axially parallel grooves 13 in the stamping heads 10a, 10b and 11a, 11b since in these zones too, excess adhesive may accumulate which then, in the course of a second stamping with the stamping heads 20a, 20b, and 21a, 21b is again distributed such that ultimately a gas-tight seal is obtained.

Figures 5, 6:
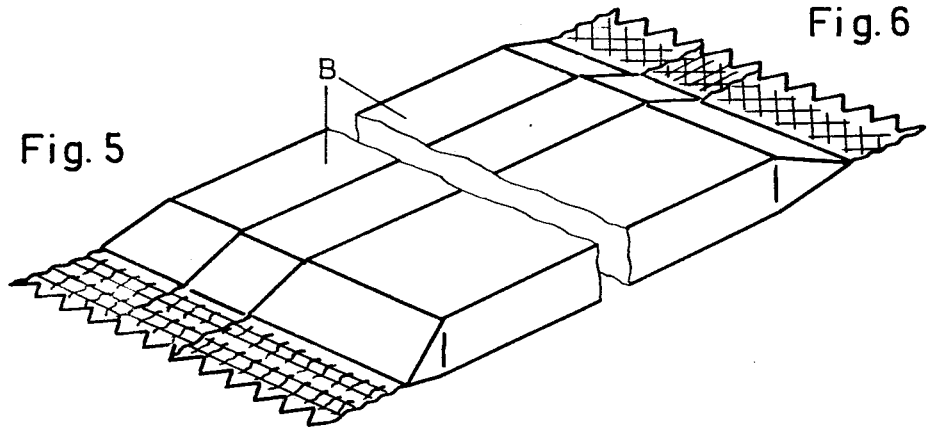
FIGS. 5 and 6 are perspective views of packages showing two different types of seals obtained with the sealing shoes structured according to the invention.

Turning now to FIGS. 5 and 6, there are shown orthogonally arranged embossed (stamped) portions of the bags. In FIG. 5 the stamped criss-cross lines extend parallel and perpendicularly to the longitudinal axis of the packaging sleeve (bag) whereas in the example shown in FIG. 6, the orthogonally arranged stamped criss-cross lines are at 45° to the longitudinal axis of the packaging sleeve. It is apparent that the pattern shown in FIG. 5 will be obtained by a sealing shoe assembly as shown in FIGS. 1-3, whereas a pattern illustrated in FIG. 6 will be obtained by stamping edges arranged on the stamping heads at a 45° inclination to the respective roll axes.

As may be observed in FIG. 1, the work faces of the stamping heads associated with the rolls 20, 21 are, substantially in their entireties aligned with the work faces of the stamping heads associated with the rolls 10, 11, as viewed in the direction of advance A of the packaging sleeve S. Such an arrangement is needed to ensure that the stamping heads carried by the rolls 20, 21 stamp the entire identical areas previously stamped by the stamping heads carried by the rolls 10, 11.

It has been unexpectedly found that by means of a sealing shoe assembly according to the invention transversely sealed wrappers of relatively thick wrapping material could be formed with roll speeds of over 200 rpm, wherein even at locations of dual wrapper thicknesses (which occurs in the longitudinal seams or at pinch folds), gas-tight seals were obtained.

As FIG. 2 shows schematically, the sealing shoes 10 and 11 are heated by known electrically heated round bars 10c und 11c. These heated bars 10c and 11c may in well known manner be introduced into bores in the rolls 10 and 11 offset of the axes of revolution near the stamping head pairs 10a, 11a for having a short way for the heat to be transferred to the stamping edges 12 and 14.

It will be understood that the above description of the present invention is susceptible to various modifications, changes and adaptations and the same are intended to be comprehended within the meaning and range of equivalents of the appended claims.

What is claimed is:

1. In a sealing shoe assembly for providing superposed sheets with a sealing seam formed by a criss-cross pattern of straight lines by pressing together areas of the superposed sheets moving through the sealing shoe assembly relative thereto in a direction of advance, the improvement comprising:
   (a) a first pair of cooperating first sealing shoes each having a work face including a plurality of parallel-extending first stamping edges oriented in a first direction and arranged to periodically assume a meshing relationship for periodically pressing together and stamping consecutive predetermined areas of the superposed sheets passing between the work faces of the first sealing shoes, whereby a first pattern of parallel straight lines is provided on said predetermined areas; and
   (b) a second pair of cooperating second sealing shoes each having a work face including a plurality of parallel-extending second stamping edges oriented in a second direction; the work faces of said second sealing shoes being in their entirety in alignment with the workfaces of said first sealing shoes as viewed in said direction of advance and said second stamping edges being arranged to periodically assume a meshing relationship for periodically pressing together and stamping, in their entirety, said predetermined areas previously stamped by said first sealing shoes, whereby a second pattern of parallel straight lines is provided on said predetermined areas; the parallel straight lines of said second pattern traversing the parallel straight lines of said first pattern, whereby said criss-cross pattern over the entire predetermined areas is obtained.

2. A sealing shoe assembly as defined in claim 1, further comprising means for heating at least sealing shoe parts containing said stamping edges.

3. A sealing shoe assembly as defined in claim 1, wherein said superposed sheets are arranged for advancement between said first and said second pair of cooperating sealing shoes and further wherein said sealing shoes are mounted on rotary rolls; said rotary rolls carrying said first pair of cooperating sealing shoes being arranged adjacent to and upstream of said rotary rolls carrying said second pair of cooperating sealing shoes as viewed in the direction of advance of the superposed sheets.

4. A sealing shoe assembly as defined in claim 3, wherein said second pair of cooperating sealing shoes includes a cutting device for severing said sheets transversely to said direction of advance.

5. A sealing shoe assembly as defined in claim 3, wherein the axes of the rotary rolls of said first and second pairs are parallel to one another.

6. A sealing shoe assembly as defined in claim 3, wherein said stamping edges are formed of alternating elevations and valleys.

7. A sealing shoe assembly as defined in claim 6, wherein at least outer faces of said elevations are of convex shape.

8. A sealing shoe assembly as defined in claim 6, wherein fully meshing state between any elevation and valley the distance between the highest point of the elevation and the lowest point of the valley is different from the distance between a flank of the elevation and an oppositely located flank of the valley.

9. A sealing shoe assembly as defined in claim 3, wherein each sealing shoe of the first pair comprises a plurality of grooves subdividing each said first stamping edge in its length.

10. A sealing shoe assembly as defined in claim 9, where the first stamping edges of the first pair of sealing shoes lie in planes perpendicular to the axes of said rotary rolls carrying said first pair of sealing shoes and further wherein said grooves extend parallel to said axes.

11. A sealing shoe assembly as defined in claim 3, wherein said first and second directions are orthogonal to one another.

12. A sealing shoe assembly as defined in claim 11, wherein one of said first and second directions is parallel to said direction of advance.

* * * * *